(12) United States Patent
Hong et al.

(10) Patent No.: US 8,001,238 B2
(45) Date of Patent: Aug. 16, 2011

(54) METHOD FOR REAL-TIME MONITORING A REMOTE CONTROL PROCESS BY A THIRD PARTY AND SYSTEM THEREOF

(75) Inventors: Lei Hong, Beijing (CN); Shuaimin Ye, Beijing (CN); Feng Gao, Beijing (CN); Huiming Li, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 413 days.

(21) Appl. No.: 12/103,737

(22) Filed: Apr. 16, 2008

(65) Prior Publication Data

US 2008/0263201 A1 Oct. 23, 2008

(30) Foreign Application Priority Data

Apr. 18, 2007 (CN) ............ 2007 1 0098471

(51) Int. Cl.
*G06F 15/16* (2006.01)
*G06F 15/173* (2006.01)
*G06F 15/177* (2006.01)
(52) U.S. Cl. .......... 709/224; 719/323; 715/778
(58) Field of Classification Search .......... 709/217–228; 719/323; 715/778
See application file for complete search history.

(56) References Cited

U.S. PATENT DOCUMENTS

| 7,633,483 B2 * | 12/2009 | Ben-Schachar et al. ...... 345/100 |
| 2006/0190532 A1 * | 8/2006 | Chadalavada ............ 709/203 |
| 2007/0124474 A1 * | 5/2007 | Margulis ................ 709/226 |
| 2007/0180493 A1 * | 8/2007 | Croft et al. .............. 726/2 |
| 2007/0243934 A1 * | 10/2007 | Little et al. ............. 463/40 |
| 2007/0244966 A1 * | 10/2007 | Stoyanov et al. .......... 709/204 |
| 2007/0250833 A1 * | 10/2007 | Araujo et al. ............ 718/1 |
| 2007/0296643 A1 * | 12/2007 | Ben-Shachar et al. ...... 345/1.1 |
| 2008/0005236 A1 * | 1/2008 | Schmieder .............. 709/204 |
| 2008/0060051 A1 * | 3/2008 | Lim ..................... 726/1 |
| 2008/0082608 A1 * | 4/2008 | Ho et al. ................ 709/204 |
| 2008/0088440 A1 * | 4/2008 | Palushaj ................ 340/539.25 |
| 2008/0177856 A1 * | 7/2008 | Howard ................. 709/212 |
| 2008/0222295 A1 * | 9/2008 | Robinson et al. ......... 709/227 |

FOREIGN PATENT DOCUMENTS

| CN | 1484167 | 3/2004 |
| CN | 1604541 | 4/2005 |

* cited by examiner

*Primary Examiner* — Haresh N Patel
(74) *Attorney, Agent, or Firm* — Dickstein Shapiro, LLP.

(57) ABSTRACT

The invention relates to a remote monitor technique. In particular, the present invention relates to a method for real-time monitoring a remote control process by a third party and a system thereof, which are able to third-party monitor a control terminal and a controlled terminal in the remote control process. The method comprises steps of establishing a connection between a control terminal and a third party monitoring terminal; arranging the control terminal, the controlled terminal and the third party monitoring terminal in one and the same session based on the connection; the controlled terminal sending its desktop video to the third party monitoring terminal via a virtual display driver; and the third party monitoring terminal sending a predetermined control strategy to the controlled terminal.

8 Claims, 3 Drawing Sheets

METHOD FOR REAL-TIME MONITORING A
REMOTE CONTROL PROCESS BY A THIRD
PARTY AND SYSTEM THEREOF

BACKGROUND OF THE INVENTION

1. Field of Invention

The present invention relates to a remote monitor technique. In particular, the present invention relates to a method for real-time monitoring a remote control process by a third party and a system thereof, which are able to perform third-party monitoring on a control terminal and a controlled terminal in a remote control process.

2. Description of Prior Art

Remote control is increasingly applied to a commercialized customer service as an approach for a remote assistance. This causes a significant problem. Since a monitored computer always stores many private data and applications, these data need to be well protected.

Currently, a video stream and a control stream for remote assistance, however, are only transmitted at a control party and a controlled party. A third party cannot monitor actions of remote control in real-time.

There are two types of connection approaches for remote control currently. One is an agency approach, in which displays and control streams of the control terminal and the controlled terminal are transferred via a broker such as LANDesk broker. The other is a point-to-point approach, in which displays and control streams of the control terminal and the controlled terminal are directly transferred in the point-to-point manner. Currently, there is no mechanism capable of monitoring the remote controls in the two approaches as described above. Therefore, it is needed to design a new monitoring mechanism under such two connection mechanisms in order to monitor the remote control in progress.

SUMMARY OF THE INVENTION

Out of considerations for the above problems, present invention is proposed. An object of the present invention is to provide a method and a system for real-time monitoring a remote control process by a third party in order to improve the security and management for the remote control process.

According to one aspect of present invention, a method for real-time monitoring a remote control process by a third party is provided, and the method comprises steps of:

establishing a connection between a control terminal and a third party monitoring terminal;

arranging the control terminal, the controlled terminal and the third party monitoring terminal in one and the same session based on the connection;

the controlled terminal sending its desktop video to the third party monitoring terminal via a virtual display driver; and the third party monitoring terminal sending a predetermined control strategy to the controlled terminal.

Preferably, the method further comprises step of: the controlled terminal authenticating the third party monitoring terminal before the controlled terminal sending its desktop video to the third party monitoring terminal via the virtual display driver.

Preferably, the controlled terminal assigns its session with the control terminal to the third party monitoring terminal.

Preferably, the method further comprises a step of: the controlled terminal receiving the access control strategy from the third party monitoring terminal; the control terminal controlling the controlled terminal based on the access control strategy.

Preferably, the method further comprises a step of: the controlled terminal sending its desktop video to the control terminal via the virtual video driver.

In another aspect of the present invention, a system for real-time monitoring a remote control process between a control terminal and a controlled terminal by a third party is provided, which comprises: at least one control terminal; at least one controlled terminal for connecting the at least one control terminal via a network, being controlled by the at least one control terminal, and assigning a session with the control terminal to the third party monitoring terminal; and at least one third party monitoring terminal for connecting the at least one controlled terminal via the network, and sending a predetermined access control strategy to the controlled terminal.

According to such a configuration as disclosed above, the third party may monitor information transmitted from the control terminal and the controlled terminal in real-time in order to monitor the remote control process.

DETAILED DESCRIPTION OF PREFERRED EMBODIMENTS

Figure 1:
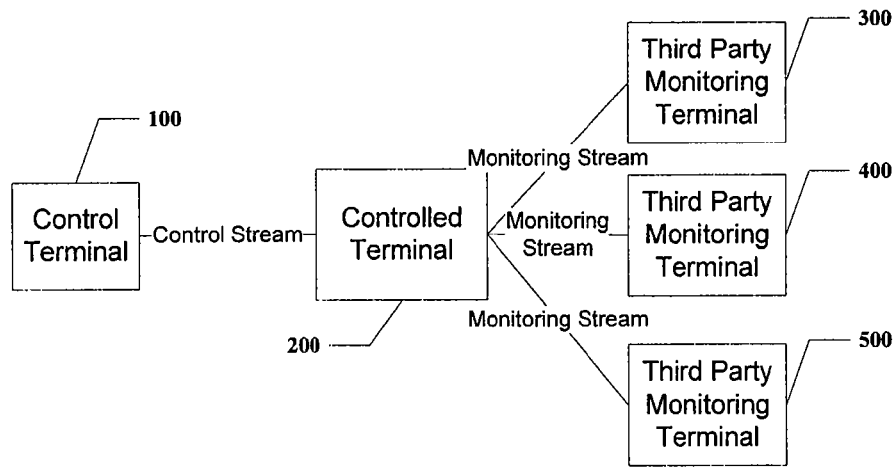
FIG. 1 is an illustrative block diagram of a system for real-time monitoring a remote control process by a third party according to an embodiment of the present invention.

Hereinafter, the present invention will be further described in detail by referring to the drawings and the embodiments in order to make the objects, technical scheme and advantages of the present invention more apparent.

FIG. 1 is an illustrative block diagram of a system for real-time monitoring a remote control process by a third party according to an embodiment of the present invention. As illustrated in FIG. 1, a system for real-time monitoring a remote control process by a third party is provided, the system comprising: at least one control terminal 100; at least one controlled terminal 200; and at least one third party monitoring terminal 300, 400 and 500. Hereinafter, one third party monitoring terminal is taken as an example for explanation. Constructions and operations of other third party monitoring terminals 400 and 500 are identical with those of the third party monitoring terminal 300.

Figure 2:
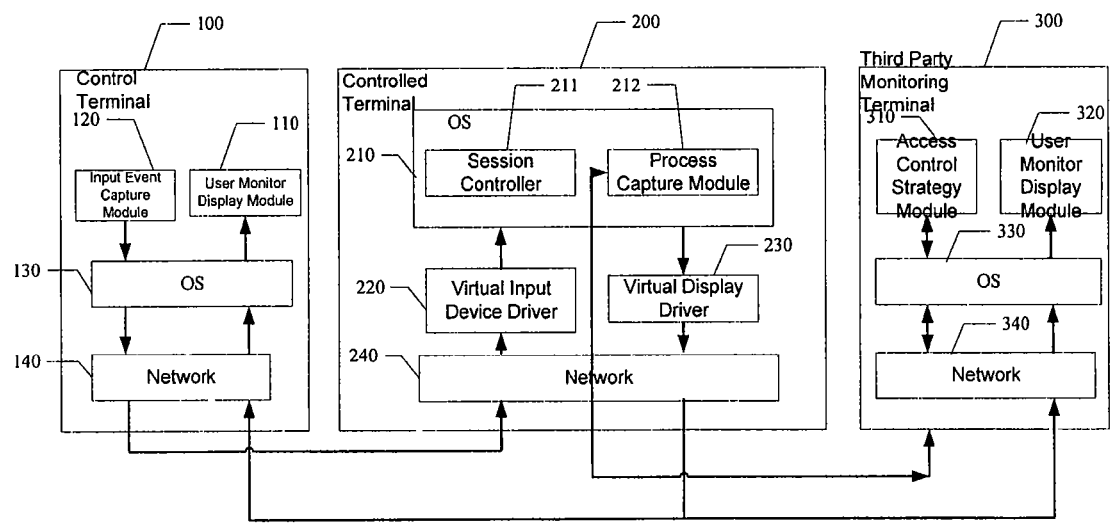
FIG. 2 is a detailed illustrative block diagram of a system for real-time monitoring a remote control process by a third party according to an embodiment of the present invention.

As illustrated in FIG. 2, the control terminal 100 includes an Input Event Capture module 120, which is for capturing a mouse and keyboard input event of the control terminal 100, and then sending the event to the controlled terminal 200 via a network. A User Monitor Display module 110 is for displaying a desktop video sent from the controlled terminal 200 on the control terminal 100.

An agency module comprising two virtual drivers is installed on the controlled terminal 200 in a remote control. One virtual driver is a display driver 230 for sending a video stream to the control terminal 100 and the third party monitoring terminal 300 via the network.

The other virtual driver is a virtual input device driver 220 for converting the mouse and keyboard event sent from the network 140 and 240 to a local mouse and keyboard event on the control terminal 200. That is to say, an input event transmitted from the control terminal 100 is received and converted and simulated into a local input event on the controlled terminal 200, in order to implement the remote control.

The agency module comprises two system procedures. One procedure is a session controller 211 for managing a session, guaranteeing the control terminal 100, the controlled terminal 200 and the third party monitoring terminal 300 in one and the same session. In other words, the session controller 211 is for managing the session, e.g. creating, assigning and destroying, another important effect of which is to arrange the control terminal, the controlled terminal and the monitoring terminal in one and the same session.

Another procedure is a procedure capture module 212, which is used for capturing a service and procedure list of the controlled terminal 200, and restricting the behavior of the control terminal according to an access control strategy pushed by the third party monitoring terminal 300. That is to say, the procedure capture module 212 is for capturing a created procedure and an initiated service upon a requirement of the controller 100 and sending them to the control terminal via the network, and determining whether to perform a corresponding procedure and a service or not when they are returned by the control terminal, so as to accomplish a right control.

An Access Control Strategy module 310 is installed on an operating system at the third party monitoring terminal 300. The Access Control Strategy module 310 is used to determine an access control strategy of the control terminal 100. The third party monitoring terminal 300 may push the access control strategy to the controlled terminal 200 so as to restrict the behavior of the control terminal 100. Additionally, a User Monitor Display module is also installed on the third party monitoring terminal 300 for displaying a desktop video sent from the controlled terminal 200.

Thus, a connection has been established between the third party monitoring terminal 300 and the agency module installed in the controlled terminal 200 and an identity authentication is performed. The third party monitoring terminal 300 may push the access control strategy to the controlled terminal 200 by means that the agency module sends a video stream from the controlled terminal 200 to the third party monitoring terminal 300 for restricting the behavior of the control terminal 100. The access strategy is based on a session, i.e. one and the same user may have different access strategies in different sessions, and may modify and update the access strategies in real time.

This mechanism implements a real-time monitoring for a whole remote control procedure by the third party in a case of any of remote control connections. It solves the problem that only a control terminal is authenticated, but a third party monitoring and an access control is disabled in a remote control procedure.

In a case that a plurality of third party monitoring terminals 300, 400 and 500 perform a third party monitoring, the controlled terminal 200 may send monitoring streams to various third party monitoring terminals 300, 400 and 500 in a broadcast manner.

Figure 3:
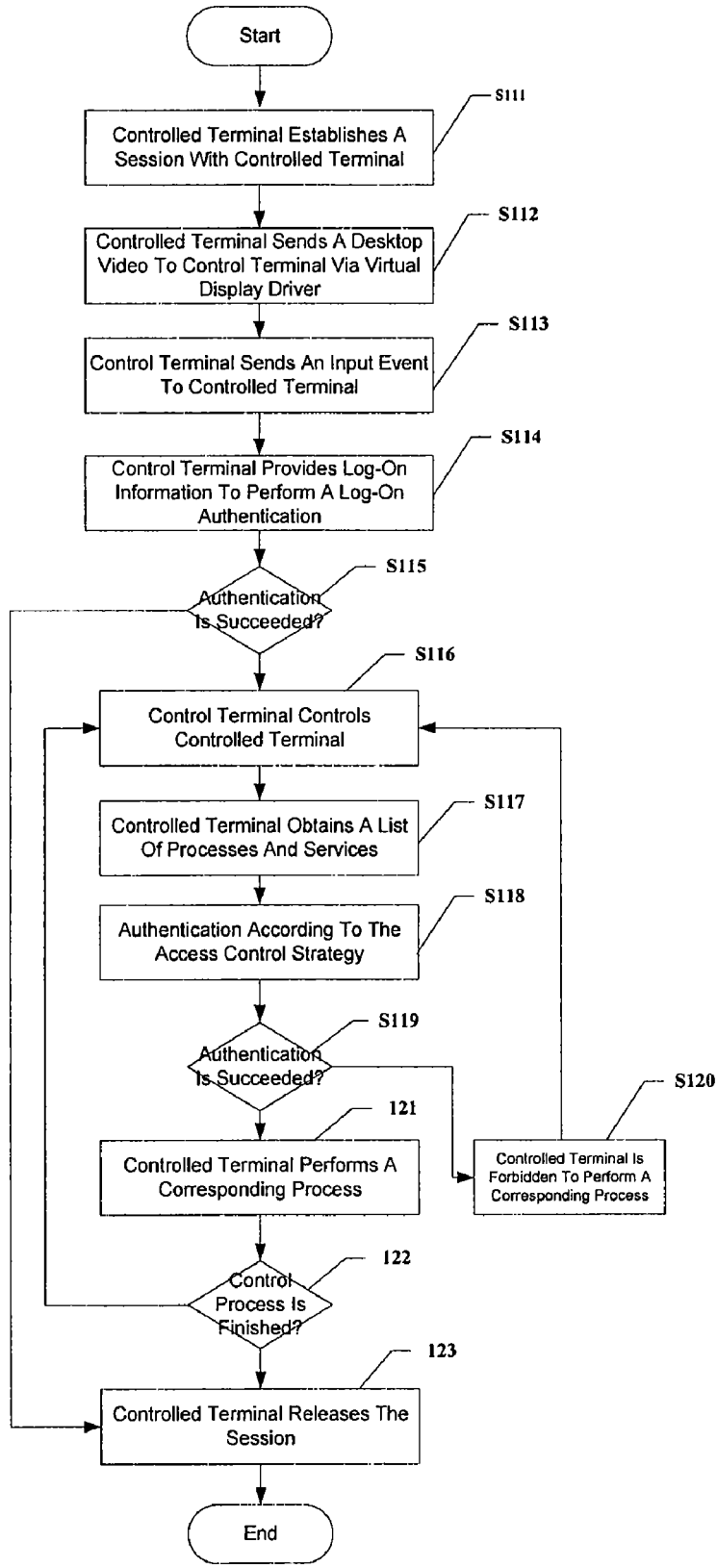
FIG. 3 is a flowchart illustrating a remote control at a control terminal and a controlled terminal.

FIG. 3 is a flowchart illustrating a remote control at a control terminal and a controlled terminal. As illustrated in FIG. 3, the control terminal 100 firstly establishes a persistent connection with the controlled terminal 200 by an IP address or a machine name, and a session is established at the controlled terminal for the connection (S111).

Then, the controlled terminal 200 encodes a video stream which should be sent to a display, and sends it to the control terminal 100 via a network through the virtual display driver 220, and the control terminal 100 decodes it to be displayed (S112).

Next, the Input Event Capture module 120 of the control terminal 100 may capture input events of the input device such as a mouse, a keyboard etc. of the control terminal. Then the input events are encoded and transmitted to the controlled terminal via the network. The input events sent from the control terminal 100 are received and decoded by the virtual input device driver 220 of the controlled terminal 200, and then are simulated into local input events of a mouse and a keyboard.

Before the control terminal 100 operates with the controlled terminal 200, it is needed to provide identity authentication information for itself.

The controlled terminal 200 authenticates the control terminal according to the identity authentication information (S114). If the authentication succeeds, the control terminal 100 obtains a control right to the controlled terminal 200 (S116). Otherwise, the session is ended by the controlled terminal 200, and the whole procedure is terminated.

After the control right is obtained, the control terminal 100 may operate with the controlled terminal. For each behavior, the controlled terminal 200 may obtain all of initiated services and procedures in the system via a Procedure Capture module 212 (S117), and compare with the access strategy in the Access Control Strategy 310 (S121). If the behavior conforms to the strategies, it will be performed (S121); otherwise, the behavior will be terminated (S120).

After one behavior is completed, it may be determined whether the control process has been finished or not (S122). If it is finished, a managed terminal releases the session (S123). Otherwise, the next behavior is performed (S116).

Figure 4:
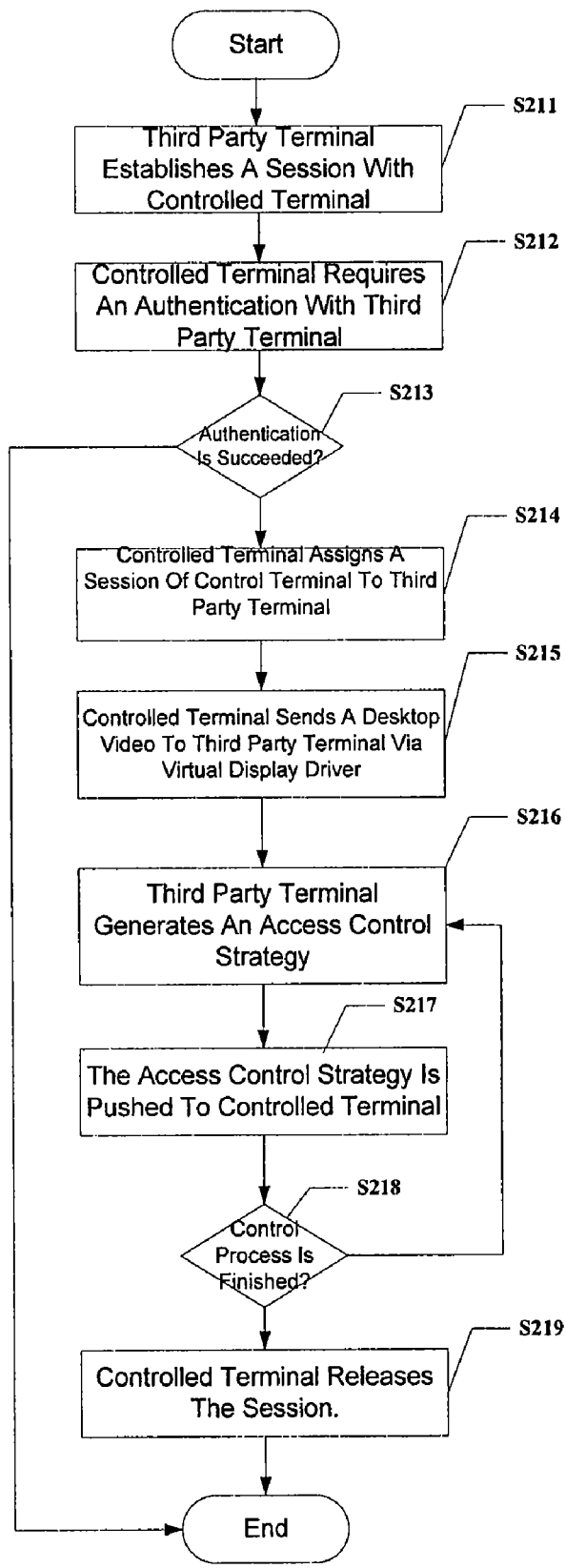
FIG. 4 is a flowchart of a method for real-time monitoring a remote control process by a third party according to an embodiment of the present invention.

FIG. 4 is a flowchart of a method for real-time monitoring a remote control process by a third party according to an embodiment of the present invention.

The third party monitoring terminal 300 establishes a persistent connection with the controlled terminal 200 by an IP address or a machine name. A session is established at the controlled terminal for the connection (S211). Before the third party monitoring terminal 300 monitors the controlled terminal 200, it is needed to provide identity authentication information for itself.

The controlled terminal 200 authenticates the third party monitoring terminal 300 according to the identity authentication information (S212-S213). If the authentication succeeds, the Session Controller 211 of the controlled terminal sends a list of all the control sessions to the third party monitoring terminal 300. The third party monitoring terminal 300 selects one session to be monitored out of the list (S214). If the authentication fails, the controlled terminal 200 will finish the session, and the whole process is terminated.

Then, the session controller 211 adds the third party monitoring terminal 300 to its specified session.

The controlled terminal 200 encodes a video stream which should be sent to a display, and sends it to the third party monitoring terminal 300 via a network through the virtual display driver 220. The third party monitoring terminal 300 decodes it to be displayed (S215).

The third party monitoring terminal 300 may create a corresponding access control strategy for the current monitoring session, in order to protect the controlled terminal 200 from being threatened by an illegal operation (S216). The third party monitoring terminal 300 may push a new access control strategy to the controlled terminal 200 via the network at any time. Different strategies may be applied to different sessions.

After one behavior is completed, it may be judged whether the monitoring process has been finished or not (S218). If finished, the controlled terminal 200 releases the session (S219). Otherwise, the next behavior is performed (S216).

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A method for real-time monitoring a remote control process between a control terminal and a controlled terminal by a third party, comprising steps of:
   establishing a connection between the controlled terminal and a third party monitoring terminal;
   arranging the control terminal, the controlled terminal and the third party monitoring terminal in a single session based on the connection;
   the controlled terminal sending its desktop video to the third party monitoring terminal via a virtual display driver;
   the third party monitoring terminal sending a predetermined control strategy to the controlled terminal, so as to restrict the control terminal's access and control of the controlled terminal;
   the controlled terminal receiving the access control strategy from the third party monitoring terminal; and
   the control terminal controlling the controlled terminal based on the access control strategy.

2. The method according to the claim 1, further comprising a step of: the controlled terminal authenticating the third party monitoring terminal before the controlled terminal sending its desktop video to the third party monitoring terminal via the virtual display driver.

3. The method according to the claim 1, wherein the controlled terminal assigns its session with the control terminal to the third party monitoring terminal.

4. The method according to the claim 1, further comprising a step of:
   the controlled terminal sending its desktop video to the control terminal via the virtual video driver.

5. A system for real-time monitoring a remote control process between a control terminal and a controlled terminal by a third party, comprising:
   at least one control terminal;
   at least one controlled terminal for connecting the at least one control terminal via a network, being controlled by the at least one control terminal, and assigning a session with the control terminal to the third party monitoring terminal; and
   at least one third party monitoring terminal for connecting the at least one controlled terminal via the network, and sending a predetermined access control strategy to the controlled terminal, so as to restrict the control terminal's access and control of the controlled terminal;
   wherein the controlled terminal receives the access control strategy from the third party monitoring terminal, and the control terminal controls the controlled terminal based on the access control strategy.

6. The system according to the claim 5, wherein the controlled terminal authenticates the third party monitoring terminal before the controlled terminal sends its desktop video to the third party monitoring terminal via the virtual display driver.

7. The system according to the claim 5, wherein the controlled terminal assigns its session with the control terminal to the third party monitoring terminal.

8. The system according to the claim 5, wherein the controlled terminal sends its desktop video to the control terminal via the virtual video driver.

* * * * *